Dec. 23, 1930.  J. B. TRIPP, JR  1,786,099
BRAKE LINING STRETCHER
Filed Feb. 6, 1929
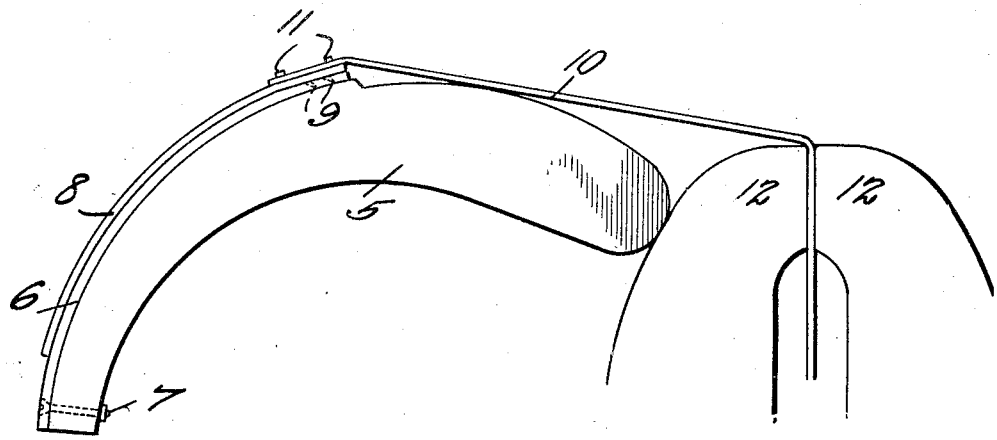
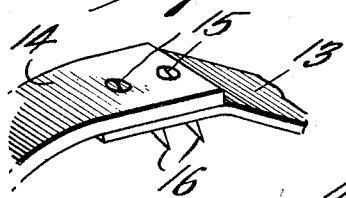
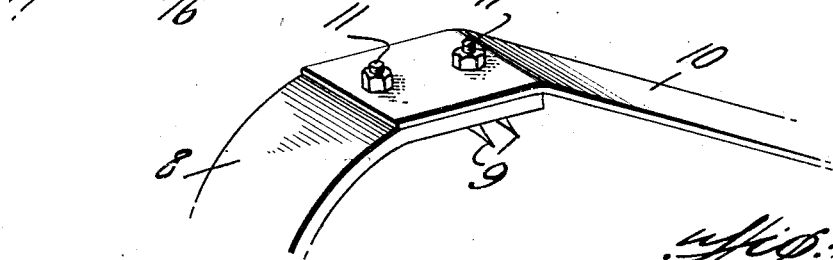
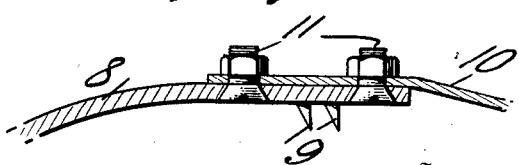
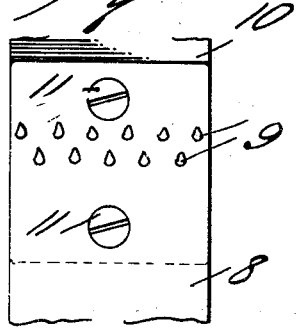
Inventor,
John B. Tripp, Jr.
By Thomas Anderman
Attorney

Patented Dec. 23, 1930

1,786,099

UNITED STATES PATENT OFFICE

JOHN B. TRIPP, JR., OF TRENTON, NEW JERSEY

BRAKE-LINING STRETCHER

Application filed February 6, 1929. Serial No. 337,906.

This invention relates to a stretcher for brake linings, and has for an object the provision of novel means whereby a brake lining after it has been anchored to a brake shoe may be tensioned and stretched prior to its being wholly secured in position on the brake shoe.

It is a further object of this invention to provide a device which may act in conjunction with a brake shoe lining and the brake shoe to which the lining is applied for stretching the lining in order that the said lining may be properly positioned and operate to better advantage than if the stretching operation is omitted; and it is furthermore an object to provide a device which can be expeditiously applied to and removed from the brake lining.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of an assembly operative to stretch a brake lining;

Figure 2 illustrates a view in perspective of the stretching device broken away at the ends;

Figure 3 illustrates an underneath plan view of a fragment of the stretcher;

Figure 4 illustrates a longitudinal sectional view of a fragment thereof; and

Figure 5 illustrates a slightly modified construction.

In these drawings, 5 denotes the brake shoe, which may be of any ordinary configuration or construction, and 6 the lining thereof, which is intended to be secured on the face of the shoe. In the present showing, one end of the lining has been secured to the brake shoe by the usual fastening 7 and this, of course, may comprise a bolt or rivet. The lining is laid on the face of the brake shoe and the end opposite the anchor 7 during the stretching operation is free or loose in order that the end may be drawn under tension during the stretching operation.

The instrumentality, in the present embodiment of the invention, for tensioning and stretching the lining comprises a plate 8, preferably of metal, in the present instance shaped to the contour of the brake shoe and having spurs or prongs 9 projecting from its under surface at one end which are intended to penetrate or be imbedded in the lining to an extent that the plate will be temporarily anchored to the lining.

A member 10, preferably pliable or flexible, has one end secured to the plate 8 by fastenings 11, such as bolts, or the like, and the said member 10 is intended to have its opposite end anchored to a stationary or fixed object and, in the present embodiment of the invention, it is shown as being held between jaws 12, such as are present in ordinary vises, although, obviously, the anchorage of this element 10 might be accomplished in other ways, without departing from the spirit of the invention, so long as there is a relation of parts which will afford a bearing for an end of the brake shoe in substantially the relation shown in Fig. 1 where the end of the brake shoe may be fulcrumed on a stationary element as the device is manipulated for stretching the lining.

It is the purpose of the inventor that after the parts have been assembled substantially in the manner shown in Fig. 1, pressure may be applied to the plate 8 and the end of the brake shoe remote from that end which is engaging the stationary object, and pressure applied to the free end of the brake shoe will result in stretching the lining. When the stretching operation has been accomplished, the lining may be held by a clamp or pliers and the stretcher removed in order that proper fastenings such as are usually employed may be inserted through the lining into the brake shoe for securing the lining in place. In practice the lining is usually drilled and then rivets or other fastenings are inserted to hold it to the brake shoe.

The element 10 may remain anchored to the stationary object and be in position for a repetition of the operation, although, of course, it may be temporarily anchored and removed for storage when not in use.

In the form of invention shown in Figure 5, the member 13 corresponding to the member 10 is applied to the under side of the member 14 corresponding to the member 8 and these are secured together by fastenings 15 and the member 13 is provided with spurs 16 corresponding to the spurs 9 on the member 8. This modification is supplied simply to show that changes may be made in the relation of parts without departing from the spirit of the invention as set forth in the annexed claims.

While the device has been described as for use in stretching linings for brake shoes, it is obvious that other objects may be acted upon by a combination of parts set forth and instead of the member 5 being a brake shoe it may be any object which would act as a lever to which the object to be stretched could be secured in substantially the way it is shown here, the said lever as a substitute for the brake shoe being manipulated as a lever for applying power during the stretching operation.

I claim:

1. In a stretcher for brake linings, a plate having members adapted to be anchored to one end of a lining of a brake shoe while one end of the brake lining is secured to said shoe, an extension of said plate adapted to be anchored to a stationary member, the said brake shoe being adapted to have its end remote from that to which the brake lining is anchored oscillate on said member in cooperative relation to the said member to which the extension of the plate is anchored, whereby the said brake shoe may be pivotally supported at one end while its lining is being stretched.

2. In a stretcher for materials, a member acting as a lever adapted to have one end pivotally engaging a fixed object, means for securing the element to be stretched to said lever, a member anchored to the member to be stretched near the end opposite that anchored to the lever, and means for holding the said member with respect to the fixed object engaged by the lever.

3. In a stretcher for linings of brake shoes, a plate adapted to conform approximately to the contour of the lining of a brake shoe when engaging said brake shoe and having means by which it is anchored to the lining of a brake shoe at one end when the opposite end of said lining is secured to the brake shoe, a stationary object, means for connecting the plate to said stationary object, the said stationary object constituting a fulcrum for the end of the brake shoe remote from the end of the brake shoe to which the lining is anchored.

4. A member adapted to be secured at approximately one end of a lining on a brake shoe, wherein the lining has its opposite end anchored to the brake shoe near one of its ends, means for anchoring said member, a stationary element on which the end of the brake shoe remote from the end to which the lining is secured is fulcrumed when the member is attached to the brake lining and anchored, whereby movement of the brake shoe causes said member to exert a pull on the lining of the brake shoe.

JOHN B. TRIPP, Jr.